United States Patent
Allmen et al.

(10) Patent No.: US 7,321,624 B1
(45) Date of Patent: Jan. 22, 2008

(54) BIT-RATE ALLOCATION SYSTEM FOR OBJECT-BASED VIDEO ENCODING

(75) Inventors: Mark Allmen, Morrison, CO (US); Zhong Zhang, Herndon, VA (US); Thomas M. Strat, Oakton, VA (US)

(73) Assignee: Objectvideo, Inc., Reston, VA (US)

( * ) Notice: Subject to any disclaimer, the term of this patent is extended or adjusted under 35 U.S.C. 154(b) by 686 days.

(21) Appl. No.: 09/809,036

(22) Filed: Mar. 16, 2001

(51) Int. Cl.
*H04N 7/18* (2006.01)

(52) U.S. Cl. .................. 375/240.08; 382/251

(58) Field of Classification Search .......... 375/240.08, 375/240.04, 240.07, 240.12, 240.18, 240.22, 375/240.01, 240.03, 240.26, 240.24, 240.29, 375/240.09; 348/401, 405, 412, 420, 415, 348/397, 398, 419, 384, 239, 578, 42, 50, 348/413, 43, 44, 46, 47, 48, 404, 416, 423, 348/402; 382/236, 232, 253, 154, 173, 255, 382/171, 291, 240, 251, 239

See application file for complete search history.

(56) References Cited

U.S. PATENT DOCUMENTS

| | | | | |
|---|---|---|---|---|
| 4,951,140 A | * | 8/1990 | Ueno et al. ............... | 348/413 |
| 5,262,856 A | * | 11/1993 | Lippman et al. ......... | 375/240.12 |
| 5,367,629 A | * | 11/1994 | Chu et al. ................. | 382/253 |
| 5,729,295 A | * | 3/1998 | Okada ....................... | 348/416 |
| 5,778,098 A | * | 7/1998 | Lee et al. .................. | 382/236 |
| 5,896,176 A | * | 4/1999 | Das et al. .................. | 375/240.15 |
| 5,969,764 A | * | 10/1999 | Sun et al. .................. | 375/240.06 |
| 5,990,957 A | * | 11/1999 | Ryoo ......................... | 348/405 |
| 6,055,330 A | * | 4/2000 | Eleftheriadis et al. ... | 382/154 |
| 6,259,828 B1 | * | 7/2001 | Crinon et al. ............. | 382/305 |
| 6,490,319 B1 | * | 12/2002 | Yang ......................... | 375/240.03 |
| 6,650,705 B1 | * | 11/2003 | Vetro et al. ............... | 375/240.08 |
| 7,046,732 B1 | * | 5/2006 | Slowe et al. .............. | 375/240.16 |
| 2002/0191846 A1 | * | 12/2002 | Crinon et al. ............. | 382/173 |

\* cited by examiner

*Primary Examiner*—Tung Vo
*Assistant Examiner*—Behrooz Senfi
(74) *Attorney, Agent, or Firm*—Venable LLP; Michael A. Sartori

(57) ABSTRACT

A video sequence is encoded, where the video sequence includes a background composite and foreground regions. The video sequence is encoded based on balancing bits per pixel for the background composite with bits per pixel for the foreground regions.

29 Claims, 5 Drawing Sheets

BIT-RATE ALLOCATION SYSTEM FOR OBJECT-BASED VIDEO ENCODING

BACKGROUND OF THE INVENTION

1. Field of the Invention

The invention relates to a system for bit-rate allocation and, particularly, bit-rate allocation for object-based video encoding.

2. Background of the Invention

In object-based video encoding, the video being input is broken into two streams, a first stream for a background composite of the video and a second stream for foreground regions of the video. The background composite is stationary and is represented as a composite image (e.g., a single image composed from a series of overlapping images). The background composite is encoded only once in the first stream. On the other hand, the foreground regions are moving and are encoded for every frame of the video in the second stream. Object-based video encoding is different from traditional frame-based encoding, which uses only one stream. As an option to conventional approaches for object-based video encoding, generation of the background composite and the foreground regions is discussed in commonly-assigned U.S. patent application Ser. No. 09/472,162, filed Dec. 27, 1999, and 09/609,919, filed Jul. 3, 2000, both of which are incorporated herein by reference.

Once the content of the two streams is determined, each stream is encoded at a desired bit rate. An encoder in this context includes a bit-rate allocation algorithm and the mechanics of generating the compressed (i.e., encoded) bit stream. The bit-rate allocation algorithm determines how much each video frame needs to be compressed and which frames need to be dropped to achieve a desired bit rate. If only a single stream is encoded, as in traditional frame-based encoding, all available bits are used by the bit-rate allocation algorithm to encode the single stream. In object-based encoding, which can use multiple streams, the appropriate portion of the available bits must first be assigned to each stream. Once the appropriate portion of the available bits are assigned, the bit-rate allocation algorithm processes each stream. If the appropriation of bits between streams is performed incorrectly, significant quality differences can arise between the streams when they are reconstructed.

To obtain a pleasing reconstructed video, the reconstructed quality of the background composite and the foreground regions should be similar. When encoding a background composite and foreground regions for lossy video compression, the amount of compression and resulting quality is controlled by the quantization step. As an example, the quantization step for the MPEG-4 standard is set to an integer value from 1 to 31, inclusive. A low quantization step indicates a better resulting quality of the reconstructed video because greater granularity exists in representing a pixel characteristic, such as the texture (e.g., color intensity) of the pixel. A low quantization step, however, results in the use of more bits to encode the video.

Unfortunately, simply setting the quantization step equal for both the background composite and the foreground regions does not necessarily result in similar reconstructed quality between the background composite and the foreground regions. Dissimilar reconstructed quality results because the background composite is coded essentially as an I-frame and because the quantization step is used to quantize the coefficients of the transformed pixel values for the background composite. Further, when the foreground regions are encoded, the quantization step quantizes prediction residuals. Because the same quantization step cannot generally be used to obtain a reconstructed video having the same or similar quality for the background composite and the foreground regions, an alternative basis is needed to obtain the same or similar quality for the background composite and the foreground regions in the reconstructed video.

SUMMARY OF THE INVENTION

An object of the invention is to provide a system to determine an appropriate bit-rate allocation between a background composite and foreground regions of a video such that the quality of the reconstructed video does not suffer.

An object of the invention is to provide a basis for obtaining the same quality, similar quality, and/or a desired quality allocation for the background composite and the foreground regions in a reconstructed video.

The invention attempts to balance the average number of bits used to encode a pixel for both the background composite and the foreground regions to achieve the same quality, similar quality, and/or a desired quality allocation between the background composite and the foreground regions.

The invention includes a method, a system, an apparatus, and an article of manufacture for bit-rate allocation.

The method of the invention includes a method for encoding a video sequence, where the video sequence comprises a background composite and foreground regions. The method comprises the step of encoding the video sequence based on balancing bits per pixel for the background composite with bits per pixel for the foreground regions. The bits per pixel for the background composite is based on a number of bits in a compressed background composite, a number of bits for warp points of the background composite, and a number of pixels in the background composite. The bits per pixel for the foreground regions is based on a number of bits in compressed foreground regions, a number of bits for shape of the foreground regions, and a number of pixels in the foreground regions. The bits per pixel for the background composite and the bits per pixel for the foreground regions are related by a balancing factor. The balancing factor comprises a correction factor and/or a quality factor. The number of bits in the compressed background composite and the number of bits in the compressed foreground regions are related to a bit budget.

The method of the invention also includes a method for encoding a video sequence, where the video sequence comprises a background composite and foreground regions. The method comprises the steps of: determining a background quantization step for the background composite based on a number of bits for a compressed background composite and an actual number of bits for the compressed background composite; encoding the background composite based on the background quantization step; determining a starting foreground quantization step for the foreground regions based on the background quantization step and a desired bit rate; and encoding the foreground regions based on the starting foreground quantization step. The method further comprises the step of: determining estimated frame dropping for encoding of the foreground regions, wherein determining the background quantization step is further based on the estimated frame dropping. The method still further comprises the steps of: determining actual frame dropping for encoding of the foreground regions; and if the actual frame dropping differs from the estimated frame dropping, re-determining the background quantization step based on the actual frame dropping.

The system of the invention includes a computer system comprising a computer-readable medium having software to operate a computer in accordance with the invention.

The apparatus of the invention includes a computer comprising a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

Definitions

A "video" refers to motion pictures represented in analog and/or digital form. Examples of video include: television, movies, image sequences from a video camera or other observer, and computer-generated image sequences.

A "frame" refers to a particular image or other discrete unit within a video.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
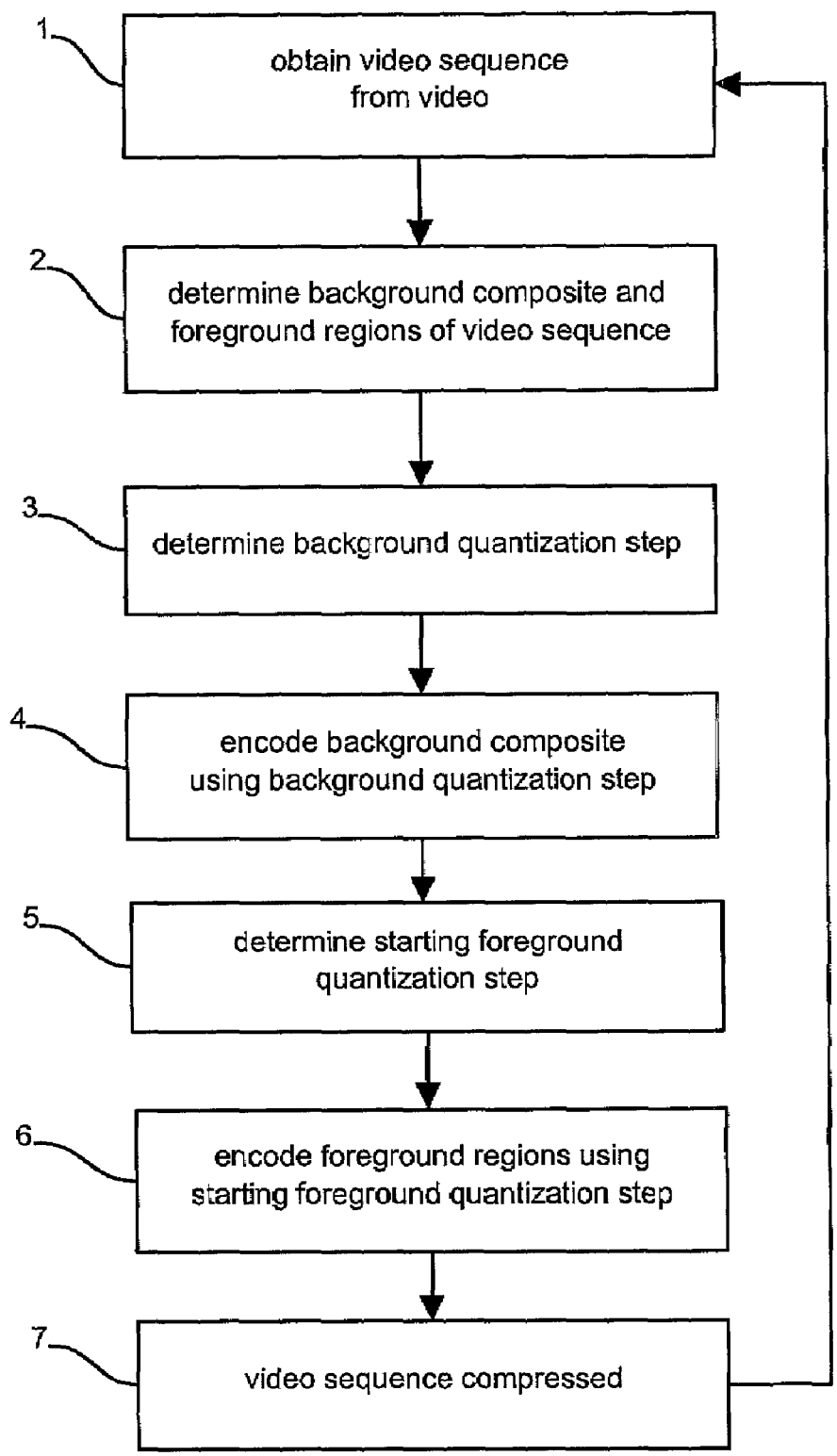
FIG. 1 illustrates a flow diagram for a first embodiment of the invention.

This invention determines an appropriate bit allocation between a background composite and foreground regions for a video. The bit-rate allocation technique of the invention attempts to balance the average number of bits used to encode a pixel for both a background composite and foreground regions of a video to achieve the same quality, similar quality, and/or a desired quality allocation between the background composite and the foreground regions in the reconstructed video. The discussion of the invention is divided into three exemplary embodiments and a system implementation.

First Embodiment

To obtain the same quality, similar quality, and/or a desired quality allocation in the background composite and the foreground regions of a reconstructed video, the invention uses the number of bits per pixel as a measure of reconstructed video quality. Bits per pixel is the number of bits used to encode the texture of a background composite or foreground regions divided by the number of pixels in the background composite or foreground regions, respectively. A lower bits per pixel value corresponds to better compression but usually corresponds to lower quality of the reconstructed video. The inventors determined that if the bits per pixel is the same for the background composite and the foreground regions, the quality of the background composite and the foreground regions in the reconstructed video can be expected to be similar.

In the MPEG-4 standard, the background composite (called a sprite) is encoded in a different manner than the foreground regions. A background composite contains the texture image itself and the point correspondences used to specify how the sprite is to be warped to create the background of each frame. The foreground regions are arbitrarily shaped in each video frame. For the foreground regions, the MPEG-4 standard encodes image texture, shape, and motion compensation vectors separately for each frame.

In order to achieve appropriate reconstructed quality in the background composite and the foreground regions, only the bits that actually contribute to the reconstructed quality of the texture of the video are considered when computing the bits per pixel. For example, when encoding the background composite, warp points are also encoded. The warp points specify how the background composite is warped for each frame and have virtually no influence on the reconstructed quality of the background composite. Hence, the bits used to encode the warp points are not considered when computing the bits per pixel. Unlike the background composite, foreground regions additionally have shape. The shape of the foreground regions, however, has virtually no influence on the reconstructed quality of the foreground regions. Hence, the bits required to encode the shape of the foreground regions are not considered when computing the bits per pixel.

The following equations describe the balancing of the bits per pixel between the background composite and foreground regions. The bits per pixel in the background composite is given by the following:

$$BP_B = \frac{B_{CB} - B_{WP}}{P_{UB}} \quad (1)$$

where $BP_B$ is the bits per pixel in the background composite; $B_{CB}$ is the number of bits in the compressed background composite, which was produced by an encoder, and which includes the number of bits for warp points; $B_{WP}$ is the number of bits for warp points and is the number of bits used by the encoder to encode the warp points in the background composite; and $P_{UB}$ is the number of pixels in the uncompressed background composite. Equation (1) provides the bits per pixel for the background composite with the bits required to encode the warp points removed. On the right-hand side of equation (1), the bits in the compressed background composite $B_{CB}$ is unknown prior to the background composite being encoded; the number of bits for warp points $B_{WP}$ is determined prior to the background composite being encoded; and the number of pixels in the uncompressed background composite $P_{UB}$ is known.

The bits per pixel in the foreground regions is given by the following:

$$BP_F = \frac{B_{CF} - B_S}{P_{UF}} \quad (2)$$

where $BP_F$ is the bits per pixel in the foreground regions; $B_{CF}$ is the number of bits in the compressed foreground regions, which was produced by an encoder, and which includes the number of bits for shape; $B_S$ is the number of bits for shape and is the number of bits used by the encoder to encode the shape of the foreground regions; and $P_{UF}$ is the number of pixels in the uncompressed foreground regions. Equation (2) provides the bits per pixel for the foreground regions with the bits required to encode shape removed. On the right-hand side of equation (2), the number of bits in the compressed foreground regions $B_{CF}$ is unknown prior to the foreground regions being encoded; the number of bits for shape $B_S$ is determined prior to the foreground regions being encoded; and the number of pixels in the uncompressed foreground regions $P_{UF}$ is known. As an option it has been determined experimentally that the number of bits for shape $B_S$ can be set to the number of perimeter pixels of the foreground regions.

The bits per pixel in the background composite and the bits per pixel in the foreground regions are related as follows:

$$BP_B = F \times BP_F \Rightarrow \frac{B_{CB} - B_{WP}}{P_{UB}} = F \frac{B_{CF} - B_S}{P_{UF}} \quad (3)$$

where $$F = F_C \times F_Q \quad (4)$$

where F is a balancing factor to account for dissimilarities in the bits per pixel in the background composite and the bits per pixel in the foreground regions, $F_C$ is a correction factor to account for the encoding efficiency difference between the background composite and the foreground regions, and $F_Q$ is a quality factor to account for a desired quality allocation between the background composite and the foreground regions.

With the correction factor $F_C$, the encoding efficiency difference between the background composite and the foreground regions is taken into consideration in balancing the bits per pixel in the background composite and the bits per pixel in the foreground regions. Through experimentation, the inventors have determined that approximately 1.5 is an appropriate value for the correction factor $F_C$ with the quality factor $F_Q$ set to 1. The encoding efficiency difference between the background composite and the foreground regions is due to the background composite being encoded as a single image, and the foreground regions being encoded for each frame. Because there is, in general, very little change from frame to frame in a video for the foreground regions, an encoder can take advantage of this low amount of change in the foreground regions when generating the bit stream for the video. By exploiting this temporal component of the foreground regions, more dramatic compression (i.e., lower pits per pixel) can be achieved for the foreground regions than with the single image of the background composite.

With the quality factor $F_Q$, a desired quality allocation between the background composite and the foreground regions is taken into consideration in balancing the bits per pixel in the background composite and the bits per pixel in the foreground regions. If the desired allocation for the bits per pixel in the background composite and the bits per pixel in the foreground regions is the same, the quality factor $F_Q$ is set to 1. However, if the desired allocation for the bits per pixel in the background composite and the bits per pixel in the foreground regions is not the same, the quality factor $F_Q$ is set to a value other than 1. If the desired allocation for the bits per pixel in the background composite is to be greater than the bits per pixel in the foreground regions, the quality factor $F_Q$ is set to a value greater than 1. On the other hand, if the desired allocation for the bits per pixel in the background composite is to be less than the bits per pixel in the foreground regions, the quality factor $F_Q$ is set to a value less than 1. As an example of using the quality factor $F_Q$, if the desired quality allocation is such that the background composite has 15% more bits per pixel than the foreground regions, the quality factor $F_Q$ is set to a value of 1.15. As another example, if the desired quality allocation is such that the background composite has 15% less bits per pixel than the foreground regions, the quality factor $F_Q$ is set to a value of 0.85.

The number of bits in the compressed background composite $B_{CB}$ and the number of bits in the compressed foreground regions $B_{CF}$ are related as follows:

$$B_{CB}+B_{CF}=BB \quad (5)$$

where BB is a bit budget. The bit budget BB is the number of bits that are available to encode a video sequence or video. The bit budget BB is given by:

$$BB=B\hat{R}\times L_V \quad (6)$$

where $B\hat{R}$ is a desired bit rate (in bits per seconds (bps)) and $L_v$ is the length of a video sequence or video (in seconds).

In equations (3) and (5), all quantities are known except for the number of bits in the compressed background $B_{CB}$ and the number of bits in the compressed foreground $B_{CF}$, which can be solved for using the two equations. $B_{CB}$ and $B_{CF}$ are the number of bits that should be produced by the encoder for the background composite and the foreground regions, respectively, to obtain the desired number of bits per pixel for the background composite and the foreground regions.

FIG. 1 illustrates a flow diagram for a first embodiment of the invention. In block 1, a video sequence is obtained from a video. The video can be obtained from, for example, a live feed, a storage device, or a network connection. The video sequence includes one or more frames of the video. The video sequence can be, for example, a portion of the video or the entire video. As a portion of the video, the video sequence can be, for example, one continuous sequence of one or more frames of the video or two or more discontinuous sequences of one or more frames of the video.

In block 2, a background composite and foreground regions of the video sequence are determined. Conventional techniques for object-based video encoding are used to separate the video sequence into the background composite and the foreground regions. With the background composite, the number of pixels in the uncompressed background composite $P_{UB}$ is determined by counting the number of pixels in the background composite, and the number of pixels in the uncompressed foreground regions $P_{UF}$ is determined by counting the number of pixels in the foreground regions. The number of bits for warp points $B_{WP}$ is determined by encoding the warp points for the background composite using an encoder, and the number of bits for shape $B_S$ is determined by encoding the shape for the foreground regions using an encoder. For example, the background composite and the foreground regions are encoded using an MPEG-4 compliant encoder, and the number of bits for warp points $B_{WP}$ and the number of bits for shape $B_S$ are determined from the output of the MPEG-4 compliant encoder. Alternatively, the number of bits for shape $B_S$ can be estimated by counting the number of perimeter pixels of the foreground regions. Further, the bit budget BB is determined according to equation (6), and the balancing factor F is set after setting the correction factor $F_C$ and the quality factor $F_Q$. After block 2, the following values for equations (3) and (5) are known: the number of pixels in the uncompressed background composite $P_{UB}$; the number of bits for warp points $B_{WP}$; the balancing factor F; the correction factor $F_C$; the quality factor $F_Q$; the number of pixels in the uncompressed foreground regions $P_{UF}$; the number of bits for shape $B_S$; and the bit budget BB.

In block 3, a background quantization step $Q_B$ is determined for use with the encoder for the background composite. An estimated background quantization step $Q_B'$ is first determined using Algorithm 1. Thereafter, the background quantization step $Q_B$ is determined using Algorithm 2 to adjust the estimated background quantization step $Q_B$ to an optimal value such that $B_{CB}$ is the number of bits used to encode the background composite.

Algorithm 1 is used to compute the estimated background quantization step $Q_B'$. Algorithm 1 operates by exploiting the general relationship between the size of an uncompressed background composite and the size of a compressed background composite using a specific quantization step. The first component of Algorithm 1 estimates the compressed size of the background composite from the uncompressed size of the background composite assuming that a background quantization step $Q_B$ of 1 is used. The second component of Algorithm 1 determines the estimated background quantization step $Q_B'$ using the estimated compressed size for a background quantization step of 1 and knowledge of how the compression rate varies as the background quantization step is changed over a specific range, for example, from 1 to 31 for the MPEG-4 standard.

Algorithm 1

1. Using the following, determine the estimated number of bits in the compressed background $B_{CB}'$ assuming a background quantization step of 1 is used:

$$B_{CB}'=0.11\times P_{UB}+24000 \quad (7)$$

where $P_{UB}$ is determined in block 1.

2. Determine the number of bits in the compressed background $B_{CB}$ with the following:

$$B_{CB} = \frac{F(BB - B_s) + \frac{B_{WP}P_{UF}}{P_{UB}}}{F + \frac{P_{UF}}{P_{UB}}} \quad (8)$$

3. Determine the background compression ratio $R_B$ with the following:

$$R_B = \frac{B_{CB}}{B_{CB}'} \quad (9)$$

where $B_{CB}'$ is provided from step 1 and $B_{CB}$ is provided from step 2.

4. Determine the estimated background quantization step $Q_B'$ using Table 1 and the background compression ratio $R_B$. With Table 1, interpolation is used, when necessary, to determine an integer value for the estimated background quantization step $Q_B'$ closest to $R_B$.

TABLE 1

| $Q_B'$ | 1 | 2 | 4 | 8 | 16 | 31 |
|---|---|---|---|---|---|---|
| $R_B$ | 1 | 1/1.64 | 1/2.7 | 1/4.43 | 1/7.27 | 1/11.92 |

For Algorithm 1, the inventors determined equation (7) experimentally for the MPEG-4 standard from a large number of background composites using linear regression. Further, equation (8) was derived by solving for $B_{CB}$ in equations (3) and (5). Moreover, the inventors experimentally determined Table 1, which indicates how the background compression ratio $R_B$ changes as the estimated background quantization step $Q_B'$ changes from 1 to 31. If an encoding technique other than the MPEG-4 standard is used, the constants in equation (7) and the values in Table 1 can be determined by those of ordinary skill through experimentation with the alternative encoding technique.

Algorithm 2 is used to determine the background quantization step $Q_B$ using the estimated background quantization step $Q_B'$ from Algorithm 1. Algorithm 2 first encodes the background composite using the estimated background quantization step $Q_B'$ and thereafter increases or decreases the background quantization step $Q_B$ depending upon whether the number of bits in the compressed background composite $B_{CB}$ is larger or smaller than the desired number of bits in the compressed background composite $\hat{B}_{CB}$ from Algorithm 1. Increasing or decreasing the background quantization step $Q_B$ is repeated until an optimal value is determined. Because the background composite is basically a single image, encoding the background composite is fast, and encoding the background composite in this iterative fashion is a reasonable approach.

Algorithm 2

1. Set two flags as follows: Increasing=False and Decreasing=False.
2. Set the background quantization step equal to the initial estimate of the background quantization step: $Q_B = Q_B'$.
3. Iterate the following:
   3.a. Encode the background composite using the background quantization step $Q_B$ to obtain a compressed background composite and determine the actual number of bits in the compressed background composite $\hat{B}_{CB}$. The background composite is encoded using, for example, an MPEG-4 compliant encoder.
   3.b. If $B_{CB} > \hat{B}_{CB}$, decrease $Q_B$ by 1, set Decreasing=True, and set Increasing=False; else, increase $Q_B$ by 1, set Decreasing=False, and set Increasing=True. $B_{CB}$ is determined in step 2 of Algorithm 1, and $\hat{B}_{CB}$ is determined in step 1 above.
   3.c. If (Decreasing=True and $B_{CB} > \hat{B}_{CB}$) or (Increasing=True and $B_{CB} < \hat{B}_{CB}$), return to step 3.a; else, continue to step 4. $B_{CB}$ is determined in step 2 of Algorithm 1, and $\hat{B}_{CB}$ is determined in step 1 above.
4. If Increasing=True, decrease $Q_B$ by 1; otherwise, increase $Q_B$ by 1.

In block 4, the background composite is encoded to obtain a compressed background composite using the background quantization step $Q_B$ determined in block 3. The background composite is encoded using, for example, an MPEG-4 compliant encoder.

In block 5, a starting foreground quantization step $Q_F$ is determined. Encoding the foreground regions differ from encoding the background composite in that only the starting quantization step is specified for the foreground regions. After the first frame, the bit-rate allocation algorithm within an MPEG-4 compliant encoder sets the foreground quantization step for each frame. The foreground quantization step can be increased to reduce reconstructed quality and use less bits if necessary, or the foreground quantization step can be decreased to produce better reconstructed quality if there are sufficient bits available.

While the MPEG-4 bit-rate control algorithm controls the foreground quantization step for the bulk of the encoding, the algorithm preferably starts with a reasonable foreground quantization step. As discussed above, it is insufficient to equate the foreground quantization step and background quantization step. However, the relationship between the foreground quantization step and background quantization step can be used to obtain an appropriate value for the starting foreground quantization step. The technique of the invention to determine a reasonable starting value for the foreground quantization step was determined experimentally by the inventors, is based on the background quantization step, and is provided in Algorithm 3.

Algorithm 3

1. If $B\hat{R} > 250$ k bps, set $Q_F = 1$.
2. If 150 k bps $< B\hat{R} \leq 250$ k bps,
   if $Q_B > 6$, set $Q_F = Q_B - 1$; else, set $Q_F = 5$.
3. If $B\hat{R} \leq 150$ k bps,
   if $Q_B > 11$, set $Q_F = Q_B - 1$; else, set $Q_F = 10$.

If an encoding technique other than MPEG-4 is used, the values for Algorithm 3 may need to be modified.

In Algorithm 3, a single foreground quantization step is determined for all of the foreground regions. As an option, Algorithm 3 can be used to determine a foreground quantization step for each foreground region. As a further option, Algorithm 3 can be used to determine foreground quantization steps for various subsets of the foreground regions.

Although encoding the background composite multiple times to determine the appropriate background quantization step is a reasonable approach, a similar approach is currently unfeasible to determine an appropriate starting foreground quantization step. If the foreground regions include multiple frames, encoding the foreground regions generally takes considerably longer time than encoding the background composite, and iterating on the foreground quantization step would be prohibitively time consuming given the current state of software and hardware.

In block 6, the foreground regions are encoded to obtain compressed foreground regions using the starting foreground quantization step $Q_F$ determined in block 5. The foreground regions are encoded using, for example, an MPEG-4 compliant encoder. With the MPEG-4 standard, the bit-rate allocation algorithm controls the value of the foreground quantization step during encoding of the foreground regions. With the invention, the bit-rate allocation algorithm starts with the starting foreground quantization step $Q_F$ from block 5.

In block 7, the compressed video sequence is obtained. The compressed video sequence includes the compressed background composite from block 4 and the compressed foreground regions from block 6. The compressed video sequence can be transmitted or stored for later reconstruction (i.e., decompression). If additional video remains to be compressed, flow proceeds back to block 1.

The technique of the invention is preferably applied to each portion of the video where the background composite is relevant (e.g., a video sequence). For example, if the video includes three shots, which results in three background composite images and three associated sets of foreground regions, the invention is applied three times to the video, one for each shot. For this example, the flow in FIG. 1 proceeds three times through blocks 1-7.

Second Embodiment

In the second embodiment, and in contrast to the first embodiment, frame dropping by the encoder is estimated. At certain bit rates, for example low bit rates, the encoder drops frames to meet the bit budget, which can cause quality differences between the background composite and the foreground regions. If frames are dropped, the number of pixels in the uncompressed foreground regions $P_{UF}$ used in equation (3) is invalid. To obtain an appropriate value for $P_{UF}$ the frames dropped by the encoder must be determined. Determining which frames are dropped, however, is a complex function of image complexity, the desired bit rate, and the preferences of a user for how the reconstructed video should appear.

As for the preferences of a user, most bit-rate allocation algorithms, including those using the MPEG-4 standard, allow the user to specify how to trade-off smoothness for crispness. Smoothness refers to the playback smoothness of the reconstructed video. In general, the reconstructed video is smoother when less frames are dropped. Crispness refers to the visual quality of each reconstructed video frame. In general, the reconstructed video is crisper when more frames are dropped. Smoothness and crispness are related because sacrificing one can enhance the other. The trade-off between smoothness and crispness is often presented to the user as a smoothness/crispness slider that varies from, for example, 0 to 1. The user can choose to emphasize smoothness by placing the slider at the smoothness end, crispness by placing the slider at the other end, or balance by placing the slider at a middle position.

As discussed above, equation (3) is based on balancing the bits per pixel for the background composite and the foreground regions. When the bit-rate allocation algorithm processes the foreground regions, the algorithm may drop frames to meet the desired bit rate and/or to emphasize crispness, depending upon the smoothness/crispness slider setting. When frames are unexpectedly dropped, the number of pixels in the uncompressed foreground regions $P_{UF}$ is unknown prior to encoding, which is contrary to the assumption made for equation (3) in the first embodiment.

For equation (3) to be accurate if frame dropping occurs, the relationship must consider the number of frames that are actually to be encoded. In other words, the number of pixels in the uncompressed foreground regions $P_{UF}$ must only include the number of pixels in the frames that are encoded. Unfortunately, which frames the bit-rate allocation algorithm will encode is difficult to determine without actually running the encoder. One approach contemplated by the inventors is to encode the foreground regions, determine which frames are dropped, re-compute the number of pixels in the uncompressed foreground regions $P_{UF}$, and re-encode the foreground regions and the background composite. As discussed earlier, however, encoding the foreground regions multiple times can be prohibitively slow given the current state of software and hardware.

Instead of determining which frames the bit-rate allocation algorithm will drop in an iterative fashion, the number of pixels in the uncompressed foreground regions $P_{UF}$ is corrected to account for dropped frames by estimating and taking into consideration the number of foreground frames that will be dropped on average by the encoder for this video. Revising equation (3), the correction takes the following form:

$$\frac{B_{CB} - B_{WP}}{P_{UB}} = F \frac{B_{CF} - B_S}{\frac{P_{UF}}{T_{SS}}} \quad (10)$$

where $T_{SS}$ is temporal sub-sampling and accounts for the average number of frames dropped by the bit-rate allocation algorithm. As an example, if every frame is encoded, the temporal sub-sampling $T_{SS}$ is set to 1; if every other frame is encoded, the temporal sub-sampling $T_{SS}$ is set to 2; and if every third frame is encoded, the temporal sub-sampling $T_{SS}$ is set to 3, and so on. An appropriate value for $T_{SS}$ is related to what the bits per pixel would be if no frames were dropped. For example, if the bits per pixel are exceptionally low, it is likely that the bit-rate allocation algorithm will drop frames when encoding the foreground regions, and in this case, $T_{SS}$ is set to a value greater than 1. As another example, if the bits per pixel are exceptionally high, it is likely that the bit-rate allocation algorithm will not drop frames when encoding the foreground regions, and in this case, $T_{SS}$ is set to a value around 1.

Figure 2:
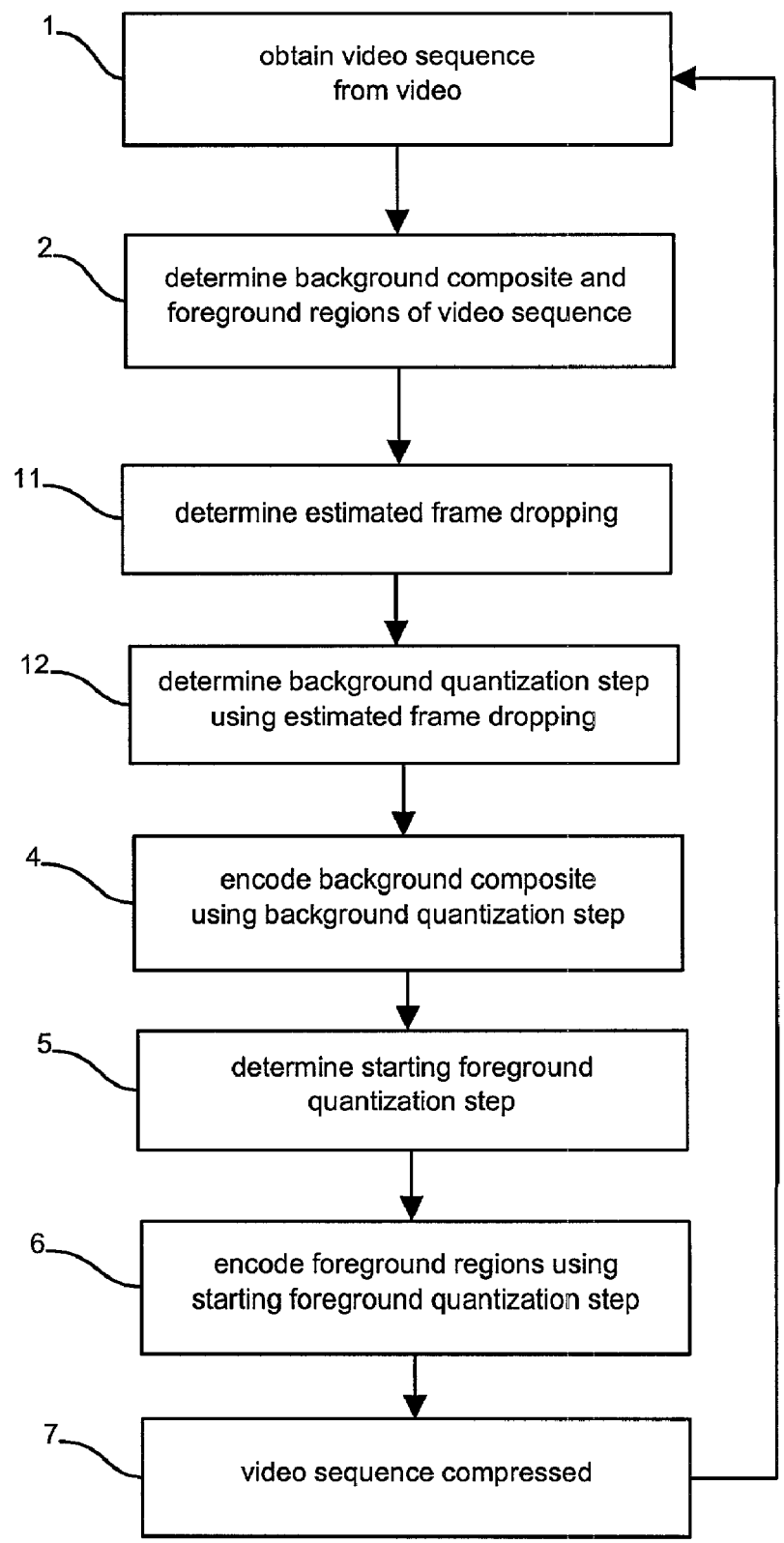
FIG. 2 illustrates a flow diagram for a second embodiment of the invention.

FIG. 2 illustrates a flow diagram for the second embodiment of the invention. FIG. 2 is identical to FIG. 1, except that block 3 in FIG. 1 is replaced by blocks 11 and 12 in FIG. 2. In block 11, the estimated frame dropping is determined using Algorithm 4.

Algorithm 4

1. Determine the number of bits in the compressed foreground regions $B_{CF}$ with the following:

$$B_{CF} = \frac{F \frac{B_S}{P_{UF}} + \frac{BB - B_{WP}}{P_{UB}}}{\frac{F}{P_{UF}} + \frac{1}{P_{UB}}} \quad (11)$$

2. Determine the bits per pixel in the foreground regions $BP_F$ using equation (2) and $B_{CF}$ from step 1.

3. Determine the temporal sub-sampling $T_{SS}$ using Table 2 and $BP_F$ from step 2.

TABLE 2

| $BP_F$ | $T_{SS}$ |
|---|---|
| $BP_F \geq 0.2$ | 1.0 |
| $0.15 \leq BP_F < 0.2$ | 1.5 |
| $0.10 \leq BP_F < 0.15$ | 2.0 |
| $0.05 \leq BP_F < 0.10$ | 2.5 |
| $BP_F < 0.05$ | 3.0 |

4. Determine the number of bits in the compressed background composite $B_{CB}$ with the following:

$$B_{CB} = \frac{F(BB - B_S) + \frac{B_{WP} P_{UF}}{P_{UB} T_{SS}}}{F + \frac{P_{UF}}{P_{UB} T_{SS}}} \quad (12)$$

For Algorithm 4, equation (11) is solved from equations (3) and (5), and equation (12) is solved from equations (10) and (5). The inventors experimentally determined Table 2 for a smoothness/crispness slider set to balance smoothness and crispness (e.g., a setting of 0.5 on a slider scale of 0 to 1) for the MPEG-4 standard. For additional settings of the smoothness/crispness slider, Table 2 can still be used, but $T_{SS}$ is likely not as accurate. Alternatively, Table 2 can be regenerated for other smoothness/crispness slider settings by experimentally determining appropriate values through trial and error. If an encoding technique other than the MPEG-4 standard is used, the values for Table 2 are not necessarily accurate.

In block 12, the background quantization step $Q_B$ is determined using the estimated frame dropping from block 11. Block 12 is identical to block 3 except that equation (12) is used to compute $B_{CB}$ in step 2 of Algorithm 1.

Third Embodiment

In the third embodiment, and in contrast to the second embodiment, actual frame dropping by the encoder is taken into consideration. After the compressed background composite and the compressed foreground regions are determined (i.e., after block 6 in FIG. 2), it is possible that the number of frames dropped by the encoder is not equal to the estimated frame dropping determined in block 11. When this occurs, the bits per pixel for the background composite and bits per pixel for the foreground regions in equation (10) (i.e., the left and right sides in equation (10)) are not equal. If the actual number of frames dropped is fewer than the estimated number of dropped frames, the quality of the reconstructed foreground regions is generally better than the quality of the reconstructed background composite. On the other hand, if the actual number of frames dropped is greater than the estimated number of dropped frames, the quality of the reconstructed foreground regions is generally worse than the quality of the reconstructed background composite.

Figure 3A:
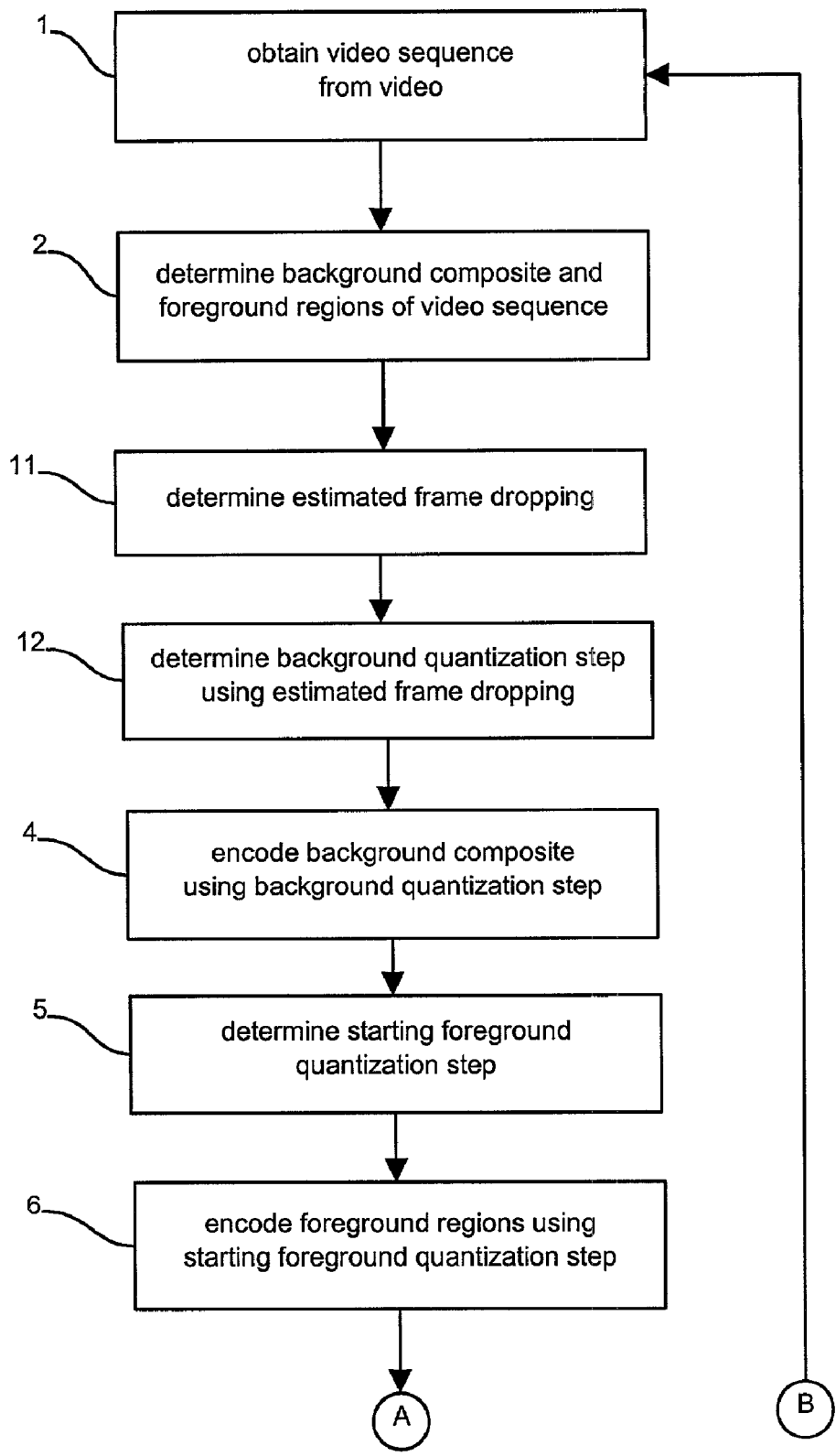
FIGS. 3A and 3B, collectively referred to as FIG. 3, illustrate a flow diagram for a third embodiment of the invention.
Figure 3B:
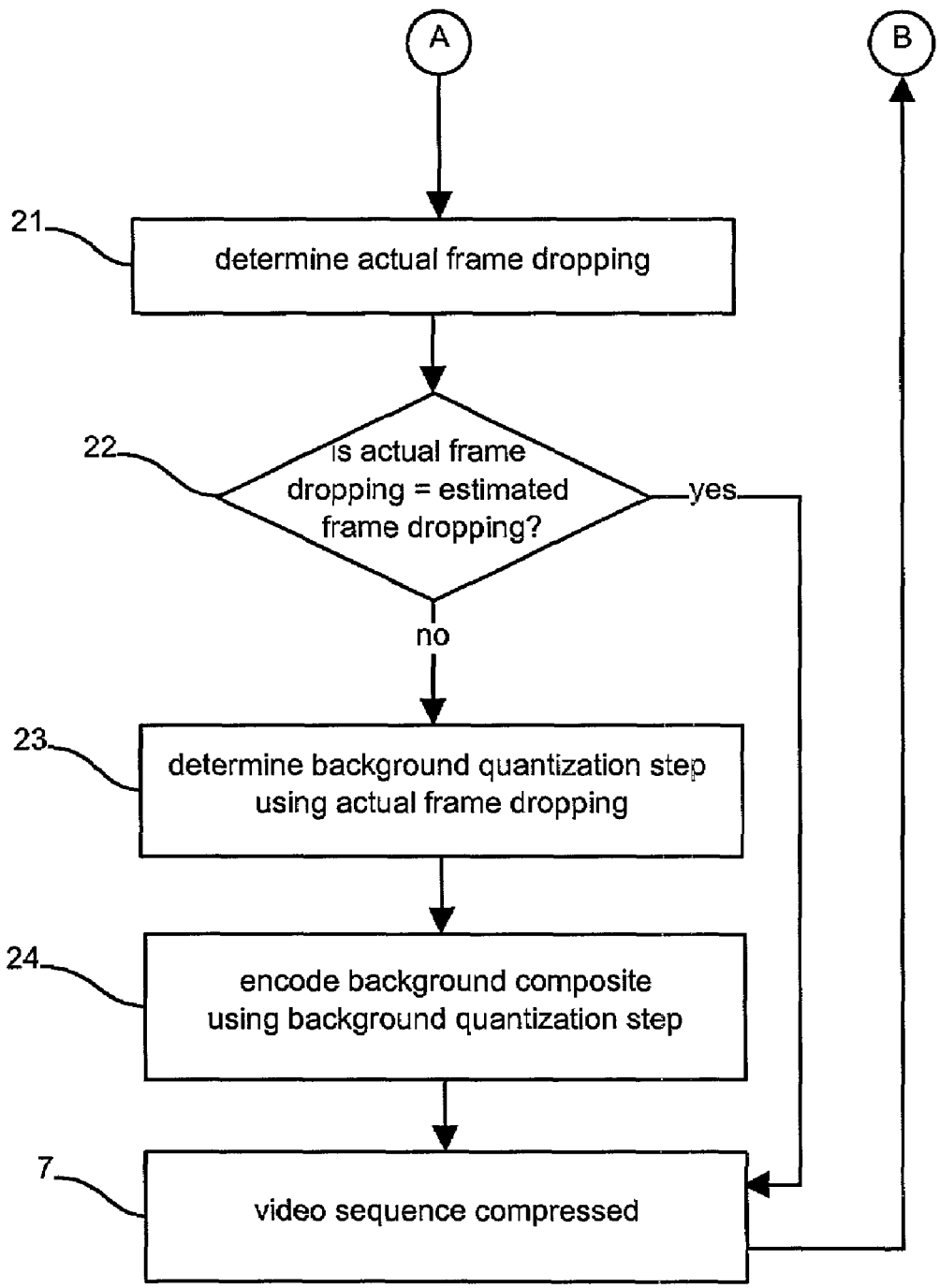

FIG. 3 illustrates a flow diagram for the third embodiment of the invention. FIG. 3 is identical to FIG. 2, except that blocks 21-24 are added between blocks 6 and 7. In block 21, the actual frame dropping is determined. The actual number of pixels in the uncompressed foreground regions $\overline{P}_{UF}$ is used as a measure of the number of frames actually dropped in encoding the foreground regions and is determined with Algorithm 5.

Algorithm 5

1. Determine which frames are dropped by the encoder in block 6 (e.g., frames 1, 3, and 6 are dropped by the encoder).
2. Determine the number of pixels in the uncompressed foreground regions for the frames dropped by the encoder $\check{P}_{UF}$.
3. Determine the actual number of pixels in the uncompressed foreground regions $\overline{P}_{UF}$ with the following:

$$\overline{P}_{UF} = P^{UF} - \check{P}_{UF} \tag{13}$$

where $P_{UF}$ is the same as in block 11 and $\check{P}_{UF}$ is from step 2.

In block 22, the actual frame dropping is compared to the estimated frame dropping. To perform the comparison, $\overline{P}_{UF}$ from block 21 is compared to $P_{UF}/T_{SS}$, where $P_{UF}$ and $T_{SS}$ are from block 11. If the actual frame dropping is equal to the estimated frame dropping (i.e., $\overline{P}_{UF} = P_{UF}/T_{SS}$), flow proceeds to block 7, and no additional adjustments are needed. If the actual frame dropping is unequal to the estimated frame dropping (i.e., $\overline{P}_{UF} \neq P_{UF}/T_{SS}$), flow proceeds to block 23, and the number of bits that should be used to compress the background composite is re-determined.

As an alternative, for blocks 21 and 22, instead of using the actual number of pixels in the uncompressed foreground regions $\overline{P}_{UF}$, the actual number of frames in the uncompressed foreground regions $\overline{F}_{UF}$ is used. For the alternative block 21, the actual number of frames in the uncompressed foreground regions $\overline{F}_{UF}$ is used as a measure of the number of frames actually dropped in encoding the foreground regions and is determined with Algorithm 5'.

Algorithm 5'

1. Determine the number of frames in uncompressed foreground regions $F_{UF}$ by counting the number of frames in the uncompressed foreground regions from block 2.
2. Determine the number of frames dropped by the encoder in block 6, namely $\check{F}_{UF}$.

3. Determine the actual number of frames in the uncompressed foreground regions $\overline{F}_{UF}$ with the following:

$$\overline{F}_{UF} = F_{UF} - \check{F}_{UF} \tag{14}$$

where $F_{UF}$ is from step 1 and $\check{F}_{UF}$ is from step 2.

For alternative block 22, the actual frame dropping is compared to the estimated frame dropping using the actual number of frames in the uncompressed foreground regions $\overline{F}_{UF}$. To perform the comparison, $\overline{F}_{UF}$ from alternative block 21 is compared to $F_{UF}/T_{SS}$, where $F_{UF}$ is from block 21 and $T_{SS}$ is from block 11. If the actual frame dropping is equal to the estimated frame dropping (i.e., $\overline{F}_{UF} = F_{UF}/T_{SS}$), flow proceeds to block 7, and no additional adjustments are needed. If the actual frame dropping is unequal to the estimated frame dropping (i.e., $\overline{F}_{UF} \neq F_{UF}/T_{SS}$), flow proceeds to block 23, and the number of bits that should be used to compress the background composite is re-determined.

In block 23, the background quantization step $Q_B$ is re-determined using the actual frame dropping. Block 23 is identical to block 3 except that $B_{CB}$ in step 2 of Algorithm 1 is set equal to $\overline{B}_{CB}$ determined from Algorithm 6. Algorithm 6 determines the new number of bits to encode the background composite based on the actual number of dropped frames.

Algorithm 6

1. Determine the actual number of bits in the compressed foreground regions $\overline{B}_{CF}$ from the compressed foreground regions of block 6.
2. Determine the actual number of pixels in the uncompressed foreground regions $\overline{P}_{UF}$ from Algorithm 5.
3. Determine the new number of bits in the compressed background composite $\overline{B}_{CB}$ using $\overline{B}_{CF}$ from step 1, $\overline{P}_{UF}$ from step 2, and the following, which is derived from equation (3):

$$\overline{B}_{CB} = F \frac{P_{UB}(\overline{B}_{CF} - B_S)}{\overline{P}_{UF}} + B_{WP} \tag{15}$$

For Algorithm 6, if the actual number of pixels in the uncompressed foreground regions $\overline{P}_{UF}$ is determined in block 21, step 2 can be shortened by using the results form block 21.

Instead of using Algorithm 6, Algorithm 6' can be used to determine the new number of bits to encode the background composite based on the actual number of dropped frames.

Algorithm 6'

1. Determine the actual number of bits in the compressed foreground regions $\overline{B}_{CF}$ from the compressed foreground regions of block 6.
2. Determine the new number of bits in the compressed background composite $\overline{B}_{CB}$ using $\overline{B}_{CF}$ from step 1 and the following, which is derived from equation (5):

$$\overline{B}_{CB} = BB - \overline{B}_{CF} \tag{16}$$

In theory, Algorithms 6 and 6' should provide identical results for the new number of bits in the compressed background composite $\overline{B}_{CB}$. Many bit-rate allocation algorithms, however, do not always use the specified number of bits. Hence, the number of bits used to compress the foreground regions may not be equal to $B_{CF}$. As a result, with Algorithm 6', the resulting bits per pixel for the background composite and the foreground regions may not be equal. In contrast, with Algorithm 6, the bits per pixel for the background composite and the foreground regions are specifically set to be equal.

In block 24, the background composite is encoded to obtain a compressed background composite using the background quantization step $Q_B$ determined in block 23. The background composite is encoded using, for example, an MPEG-4 compliant encoder. From block 24, flow proceeds to block 7.

System Implementation

Figure 4:
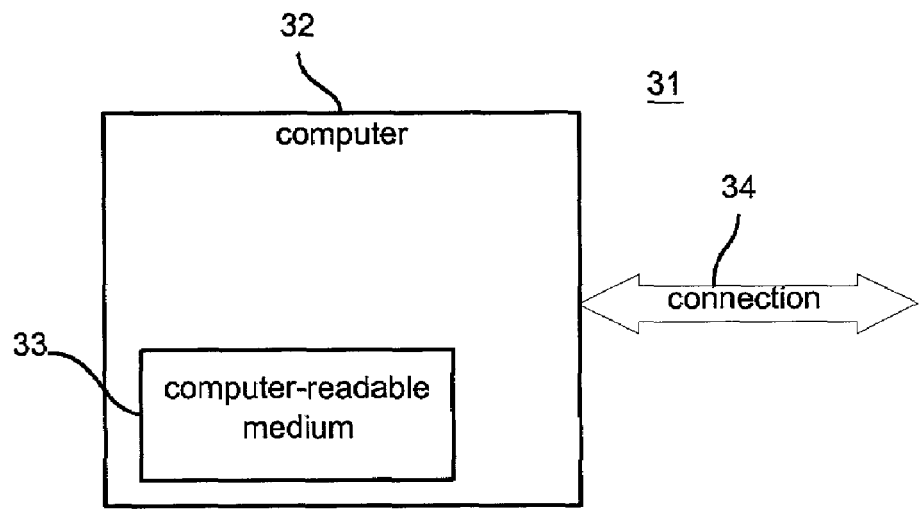
FIG. 4 illustrates a system implementation of the invention.

FIG. 4 illustrates a plan view for a system implementation of the invention. The computer system 31 includes a computer 32 for implementing the invention. The computer 32 includes a computer-readable medium 33 embodying software for implementing the invention and/or software to operate the computer 32 in accordance with the invention. A video for use with the computer system 31 resides on the computer-readable medium 33 or is provided via a connection 34. The connection 34 can receive, for example, a live feed video or a computer-readable file containing a video. The connection 34 can be coupled to, for example, a video camera, another computer-readable medium, or a network.

The invention has the following noteworthy property. As the length of the video sequence increases, the quality of the compressed video sequence increases, and the quantization step used for the background composite decreases. Intuitively, this occurs due to a longer video sequence over which to encode the background composite. This property results whether the video sequence is based on a static viewpoint, a panning viewpoint, a tilting viewpoint, and/or a translating viewpoint.

As an example of this property, a static video camera captures a video with moving foreground objects. A video sequence from the video is obtained and is 100 frames in length. If the video sequence is extended to 200 frames and the content remains similar to the content in the 100 frames, the available bit budget is doubled. With the invention, all of the additional bits are not used to compress the foreground regions and are, instead, applied to compress both the background composite and foreground regions to satisfy equations (3) and (5) (or equations (10) and (5)). Since the background composite is presumably unchanged for both the 100 frames and the 200 frames, the reconstructed quality of the background composite is greater for the 200 frames than for the 100 frames.

As a further example of this property, without loss of generality, consider a simplified version of equation (3) where the bits for shape, the bits for warp points, and the balancing factor are removed:

$$\frac{B_{CB}}{P_{UB}} = \frac{B_{CF}}{P_{UF}} \quad (17)$$

Solving equation (17) for $B_{CB}$ using equations (5) and (6) results in:

$$B_{CB} = \frac{P_{UB} \times B\hat{R} \times L_Y}{P_{UB} + P_{UF}} \quad (18)$$

Figure 5:
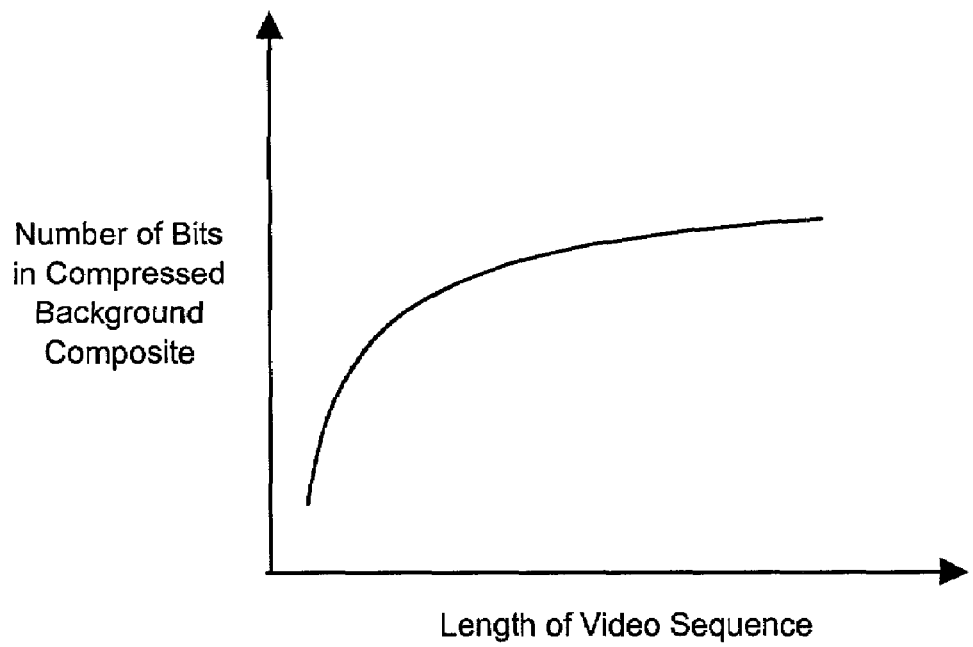
FIG. 5 illustrates a graph comparing the number of bits in a compressed background composite and the length of a video sequence.

FIG. 5 illustrates a graph for equation (18) comparing the number of bits in the compressed background composite $B_{CB}$ and length of a video sequence $L_V$. As can be seen in the graph, the number of bits in the compressed background composite $B_{CB}$ increases asymptotically with the length of the video sequence.

In describing the invention, the MPEG-4 standard is used as an exemplary encoding technique. Other encoding techniques can be used with the invention, for example, H.263.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method for encoding a video sequence with a non-static viewpoint, said video sequence having a plurality of frames and comprising a background composite constructed from the plurality of frames and foreground regions for individual frames of the plurality of frames, comprising the step of:

encoding said video sequence based on balancing bits per pixel for said background composite with bits per pixel for said foreground regions to achieve similar quality between the background composite and the foreground regions in a reconstructed video sequence, wherein said bits per pixel for said background composite are based on a number of bits for texture encoding of said background composite and a number of bits for warp points of said background composite, and said bits per pixel for said foreground regions are based on a number of bits for texture encoding of said foreground regions and a number of bits for shape encoding for said foreground regions.

2. A method as in claim 1, wherein said bits per pixel for said background composite and said bits per pixel for said foreground regions are related by a balancing factor.

3. A method as in claim 2, wherein said balancing factor comprises a correction factor.

4. A method as in claim 2, wherein said balancing factor comprises a quality factor.

5. A method as in claim 1, wherein said number of bits in said compressed background composite and said number of bits in said compressed foreground regions are related to a bit budget.

6. A method as in claim 1, wherein said step of encoding comprises the step of:

determining a background quantization step for said background composite based on a number of bits for a compressed background composite and an actual number of bits for said compressed background composite.

7. A method as in claim 6, wherein said step of determining said background quantization step comprises the step of:

encoding said background composite iteratively to obtain said actual number of bits for said compressed background composite.

8. A method as in claim 6, wherein said step of determining said background quantization step comprises the step of:

determining an estimated background quantization step based on an estimated number of bits for said compressed background composite and said number of bits for said compressed background composite, wherein said step of determining said background quantization step is further based on said estimated background quantization step.

9. A method as in claim 1, wherein said step of encoding comprises the step of:
determining a starting foreground quantization step for said foreground regions based on a background quantization step for said background composite and a desired bit rate.

10. A method as in claim 1, wherein said step of encoding comprises the step of:
determining estimated frame dropping for encoding of said foreground regions.

11. A method as in claim 10, wherein said step of determining said estimated frame dropping is based on a bit budget and a temporal sub-sampling.

12. A method as in claim 10, wherein said step of encoding further comprises the step of:
determining a background quantization step for said background composite based on said estimated frame dropping and an actual number of bits for said compressed background composite.

13. A method as in claim 1, further comprising the steps of:
determining estimated frame dropping for encoding of said foreground regions; and
determining actual frame dropping for encoding of said foreground regions; and
if said actual frame dropping differs from an estimated frame dropping, determining said background quantization step based on said actual frame dropping.

14. A computer system having software stored thereon for performing the method of claim 1.

15. A computer-readable medium having software stored thereon for performing the method of claim 1.

16. An apparatus for encoding a video sequence with a non-static viewpoint, said video sequence having a plurality of frames and comprising a background composite constructed from the plurality of frames and foreground regions for individual frames of the plurality of frames, comprising:
a computer to encode said video sequence based on balancing bits per pixel for said background composite with bits per pixel for said foreground regions to achieve similar quality between the background composite and the foreground regions in a reconstructed video sequence, wherein said bits per pixel for said background composite are based on a number of bits for texture encoding of said background composite and a number of bits for warp points of said background composite, and said bits per pixel for said foreground regions are based on a number of bits for texture encoding of said foreground regions and a number of bits for shape encoding for said foreground regions.

17. A method for encoding a video sequence with a non-static viewpoint, said video sequence having a plurality of frames and comprising a background composite constructed from the plurality of frames and foreground regions for individual frames of the plurality of frames, comprising the steps of:
determining a background quantization step for said background composite based on an estimated number of bits for a compressed background composite, a number of bits for the compressed background composite, and an estimated background quantization step, wherein the estimated background quantization step is based on the estimated number of bits for the compressed background composite and the number of bits for the compressed background composite;
encoding said background composite once per said video sequence based on said background quantization step;
determining a starting foreground quantization step for said foreground regions based on said background quantization step and a desired bit rate; and
encoding said foreground regions on a per frame basis based on said starting foreground quantization step to achieve similar quality between the background composite and the foreground regions in a reconstructed video sequence.

18. A method as in claim 17, wherein said step of determining said background quantization step comprises the step of:
encoding said background composite iteratively to obtain an actual number of bits for said compressed background composite.

19. A method as in claim 17, wherein said step of determining said background quantization step comprises the step of:
determining a background quantization step iteratively based on the estimated background quantization step.

20. A method as in claim 17, further comprising the step of:
determining estimated frame dropping for encoding of said foreground regions, wherein determining said background quantization step is further based on said estimated frame dropping.

21. A method as in claim 20, wherein said step of determining said estimated frame dropping is based on a bit budget and a temporal sub-sampling.

22. A method as in claim 20, further comprising the steps of:
determining actual frame dropping for encoding of said foreground regions; and
if said actual frame dropping differs from said estimated frame dropping, re-determining said background quantization step based on said actual frame dropping.

23. A computer system having software stored thereon for performing the method of claim 17.

24. A computer-readable medium having software stored thereon for performing the method of claim 17.

25. An apparatus for encoding a video sequence with a non-static viewpoint, said video sequence having a plurality of frames and comprising a background composite constructed from the plurality of frames and foreground regions for individual frames of the plurality of frames, comprising:
means for determining a background quantization step for said background composite based on an estimated number of bits for a compressed background composite, a number of bits for the compressed background composite, and an estimated background quantization step, wherein the estimated background quantization step is based on the estimated number of bits for the compressed background composite and the number of bits for the compressed background composite;
means for encoding said background composite once per said video sequence based on said background quantization step;
means for determining a starting foreground quantization step for said foreground regions based on said background quantization step and a desired bit rate; and
means for encoding said foreground regions on a per frame basis based on said starting foreground quantization step to achieve similar quality between the background composite and the foreground regions in a reconstructed video sequence.

26. An apparatus as in claim 25, further comprising:
means for determining estimated frame dropping for encoding of said foreground regions, wherein said means for determining said background quantization step is further based on said estimated frame dropping.

27. An apparatus as in claim 26, further comprising:
means for determining actual frame dropping for encoding of said foreground regions; and
means for re-determining said background quantization step based on said actual frame dropping if said actual frame dropping differs from said estimated frame dropping.

28. An apparatus for encoding a video sequence with a non-static viewpoint, said video sequence having a plurality of frames and comprising a background composite constructed from the plurality of frames and foreground regions for individual frames of the plurality of frames, wherein the apparatus is adapted to:
encode said video sequence based on balancing bits per pixel for said background composite with bits per pixel for said foreground regions to achieve similar quality between the background composite and the foreground regions in a reconstructed video sequence, wherein said bits per pixel for said background composite are based on a number of bits for texture encoding of said background composite and a number of bits for warp points of said background composite, and said bits per pixel for said foreground regions are based on a number of bits for texture encoding of said foreground regions and a number of bits for shape encoding for said foreground regions.

29. An apparatus of claim 28, wherein the apparatus comprises application specification hardware to emulate a computer and/or software.

* * * * *